United States Patent
Wu et al.

(10) Patent No.: US 8,400,458 B2
(45) Date of Patent: Mar. 19, 2013

(54) METHOD AND SYSTEM FOR BLOCKING DATA ON A GPU

(75) Inventors: Ren Wu, San Jose, CA (US); Bin Zhang, Fremont, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 12/556,401

(22) Filed: Sep. 9, 2009

(65) Prior Publication Data

US 2011/0057937 A1    Mar. 10, 2011

(51) Int. Cl.
*G06F 15/80* (2006.01)

(52) U.S. Cl. ........ 345/503; 345/501; 345/502; 345/505; 345/506; 345/520

(58) Field of Classification Search .......... 345/501–506, 345/520
See application file for complete search history.

(56) References Cited

U.S. PATENT DOCUMENTS

| | | | | |
|---|---|---|---|---|
| 5,612,863 A * | 3/1997 | De Lange | ........................ | 700/5 |
| 5,794,178 A * | 8/1998 | Caid et al. | ........................ | 704/9 |
| 5,812,147 A * | 9/1998 | Van Hook et al. | ............. | 345/537 |
| 7,496,411 B2 * | 2/2009 | Nakamura | ........................ | 700/11 |
| 7,755,631 B1 * | 7/2010 | Mrazek et al. | ................. | 345/501 |
| 2004/0135785 A1* | 7/2004 | Lin et al. | ........................ | 345/501 |
| 2006/0232590 A1* | 10/2006 | Bakalash et al. | .............. | 345/502 |
| 2007/0273699 A1* | 11/2007 | Sasaki et al. | .................. | 345/502 |
| 2009/0027403 A1* | 1/2009 | Jung | ............................. | 345/505 |
| 2009/0315891 A1* | 12/2009 | Lesser et al. | .................. | 345/440 |
| 2009/0322783 A1* | 12/2009 | Ingber et al. | .................. | 345/619 |
| 2010/0214290 A1* | 8/2010 | Shiell et al. | ................... | 345/420 |
| 2010/0272367 A1* | 10/2010 | Criminisi et al. | ............. | 382/195 |
| 2010/0315419 A1* | 12/2010 | Baker | ........................... | 345/420 |

* cited by examiner

*Primary Examiner* — Xiao M. Wu
*Assistant Examiner* — Todd Buttram (57) ABSTRACT

A method is provided for optimizing computer processes executing on a graphics processing unit (GPU) and a central processing unit (CPU). Process data is subdivided into sequentially processed data and parallel processed data. The parallel processed data is subdivided into a plurality of data blocks assigned to a plurality of processing cores of the GPU. The data blocks on the GPU are processed with other data blocks in parallel on the plurality of processing cores. Sequentially processed data is processed on the CPU. Result data processed on the CPU is returned.

20 Claims, 9 Drawing Sheets

```
Memcpy(dgc, hgc);
while (1)
{
    while (ns = streamAvail() && !done)
    {
            hnb - nextBlock();
            MemcpyAsync(db, hnb, ns);
            DTranspose(db, dtb, ns);
            DAssignCluster(dtb, dc, ns);
            MemcpyAsync(hc, dc, ns);
    }
    while (ns = streamDone())
            aggregateCentroid(hc, hb, ns);

if (done)
            break;
    else
            yield();
}
calcCentroid(hgc);
```

METHOD AND SYSTEM FOR BLOCKING DATA ON A GPU

BACKGROUND

Business intelligence (BI) is used to help a business acquire a better understanding of the business's commercial context and aims to support better business decision-making. Business intelligence can use sophisticated algorithms and processes that process petabyte-size data sets and provide fast responses to a broad base of users. While massively parallel data management systems have been used to scale data management capacity, central processing unit (CPU) processing of BI analytics and data integration analytics has become a bottleneck in the data management systems.

DETAILED DESCRIPTION

Alterations and further modifications of the inventive features illustrated herein, and additional applications of technology as illustrated herein, which would occur to one skilled in the relevant art and having possession of this disclosure, are to be considered within the scope of the invention. The same reference numerals in different drawings represent the same element.

Graphics processors (GPUs) can be used for high-performance support for processing business intelligence (BI) analytics. GPUs can be used for more than the originally-targeted graphics applications and become a viable choice for other business purpose computing tasks. With a GPU's many lightweight data-parallel cores, GPUs can provide substantial computational power for running general business purpose applications at a lower capital equipment cost and at much higher power efficiency, and can contribute to a greener economy while lowering operating costs.

Graphics processors (GPUs) were originally designed for a very specific domain of accelerating a graphics pipeline. With performance gains from GPU's parallel processing, GPUs may be used for general purpose computing, by mapping general purpose applications onto graphics APIs. Using GPUs for general purpose computing is known as the General Purpose GPU (GPGPU).

Although GPUs can improve application performance, the use of CPUs in conjunction with GPUs can provide advantages and performance gains not available to a CPU only implementation or GPU only implementation of an application. Processes configured to use both a CPU and a GPU may compute faster than a CPU only process or a GPU only process. Due to the differences in architecture between GPUs and CPUs, a process may be designed and developed around the advantages of each architecture and avoiding each architectures limitations and drawbacks.

Figure 1A:
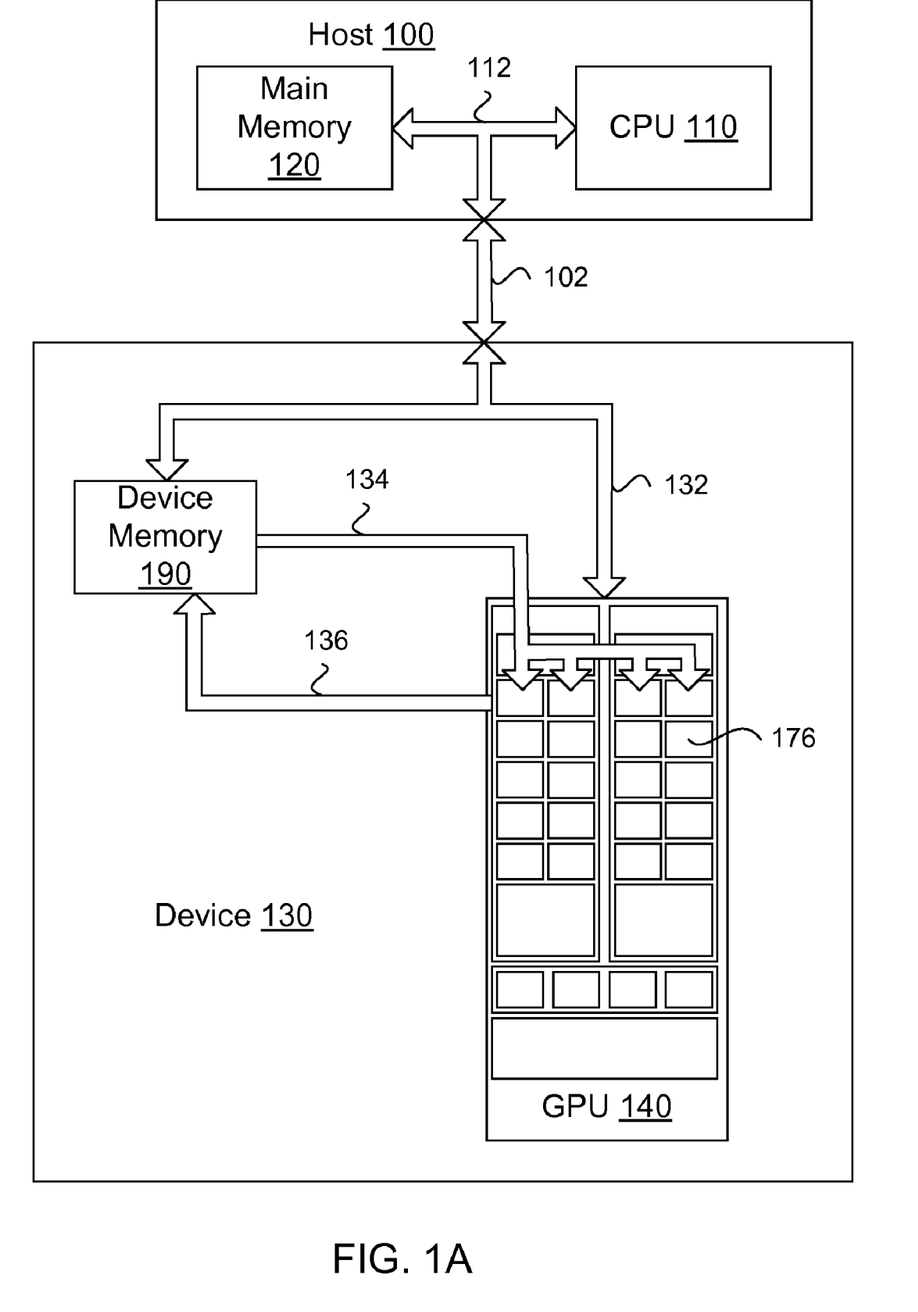
FIG. 1A is an illustration of a central processing unit (CPU), a graphics processing unit (GPU), and memory in accordance with an embodiment.

As illustrated in FIG. 1A, a CPU 110 and main memory 120 within a host 100 may be electrically or optically coupled together with a CPU-memory bus 112. The host may be coupled to a GPU-type device 130 with a host-device bus 102. The host-device bus may be a Peripheral Component Interconnect Express (PCI-e) bus, a motherboard-level interconnect, point-to-point serial link bus, or a shared parallel bus. The GPU 140 and device memory 190 within the device may be coupled with a GPU-memory bus 132. The data stored in the device memory may be sent 134 to each processing core 176 of the GPU in parallel, and the results of each processing core may be returned 136 and stored in the device memory in parallel.

Figure 1B:
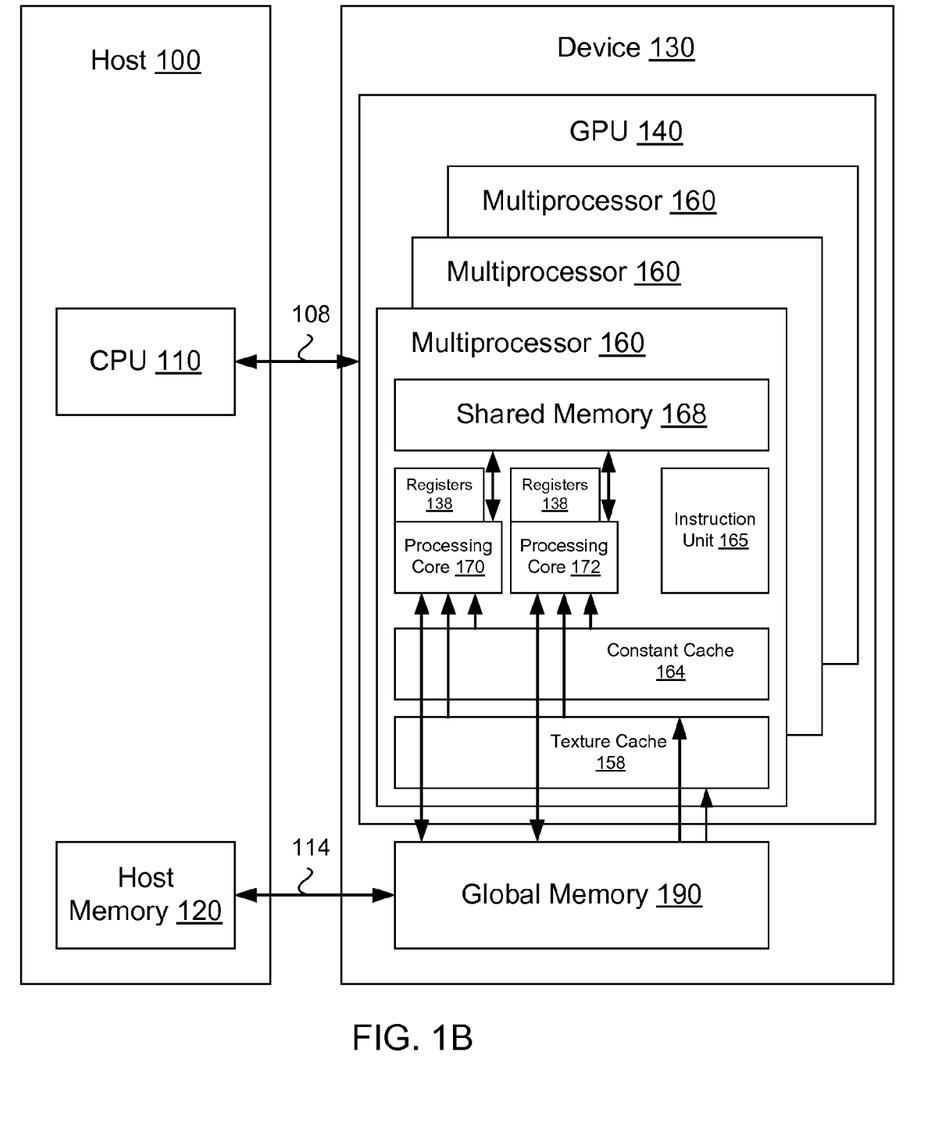
FIG. 1B is an illustration of a central processing unit (CPU), a graphics processing unit (GPU), and memory in accordance with an embodiment.

As illustrated in FIG. 1B, a device 130 including a GPU 140 may have different types of memory for different purposes in different locations within the device and the different types of memory may have different access speeds, limitations, and properties. A device may have a global memory 190 external to the GPU, a texture cache 158, a constant cache 164, and a shared memory 168 within a multiprocessor (MP) 160 of a GPU. Local GPU memory may refer to the texture cache, the constant cache, and/or the shared memory component within the MP or accessible to a cluster of processing cores or may refer to just to the shared memory component and not to the texture cache and constant cache. Each GPU may include plurality of multiprocessor units. Each multiprocessor may a include plurality of a processing cores 170, 172 (e.g. 2-16 cores). A processing core may be a processing unit with its own registers 138 that can take instructions and process data according to the instructions. In a GPU, the processing core may be called a stream processor (SP). The GPU processing core can be designed to have each processing core process different data according to the same instructions for the GPU or multiprocessor, so one instruction unit 165 may be used for each multiprocessor unit. The processing cores may be configured to read and write data to memory, such as shared memory and global memory, or just read memory, such as texture cache and constant cache. The processing core may be configured to read data from local memory to the multiprocessor, such as a multiprocessor's shared memory, constant cache, texture cache, and local GPU memory, but not another multiprocessor's shared memory, constant cache, texture cache, and local GPU memory. The processing core may be configured to read and write data to global memory accessible to every processing core. Local memory may have faster access times or shorter latencies than global memory, but global memory may have more accessibility and functionality to all the processing cores. The CPU's host memory 120 may be coupled directly to the GPU's global memory 190 using a memory bus 114. The memory bus may be a PCI-e bus. Memory for a host may be referred to as host memory, main memory, or CPU memory. Memory for a device may be referred to as device memory, global memory, or GPU memory. The CPU 110 may be coupled to the GPU using an inter-processor bus 108.

A cache may be a type of memory or collection of data duplicating original values stored elsewhere or computed earlier, where the original data may be expensive to fetch owing to longer access time or may be expensive to compute compared to the cost of reading the cache. A cache can be a temporary storage area where frequently accessed data can be stored for rapid access. Once the data is stored in the cache, the data can be used in the future by accessing the cached copy rather than re-fetching or recomputing the original data. A cache may be read only memory (ROM) to a processing core.

Figure 1C:
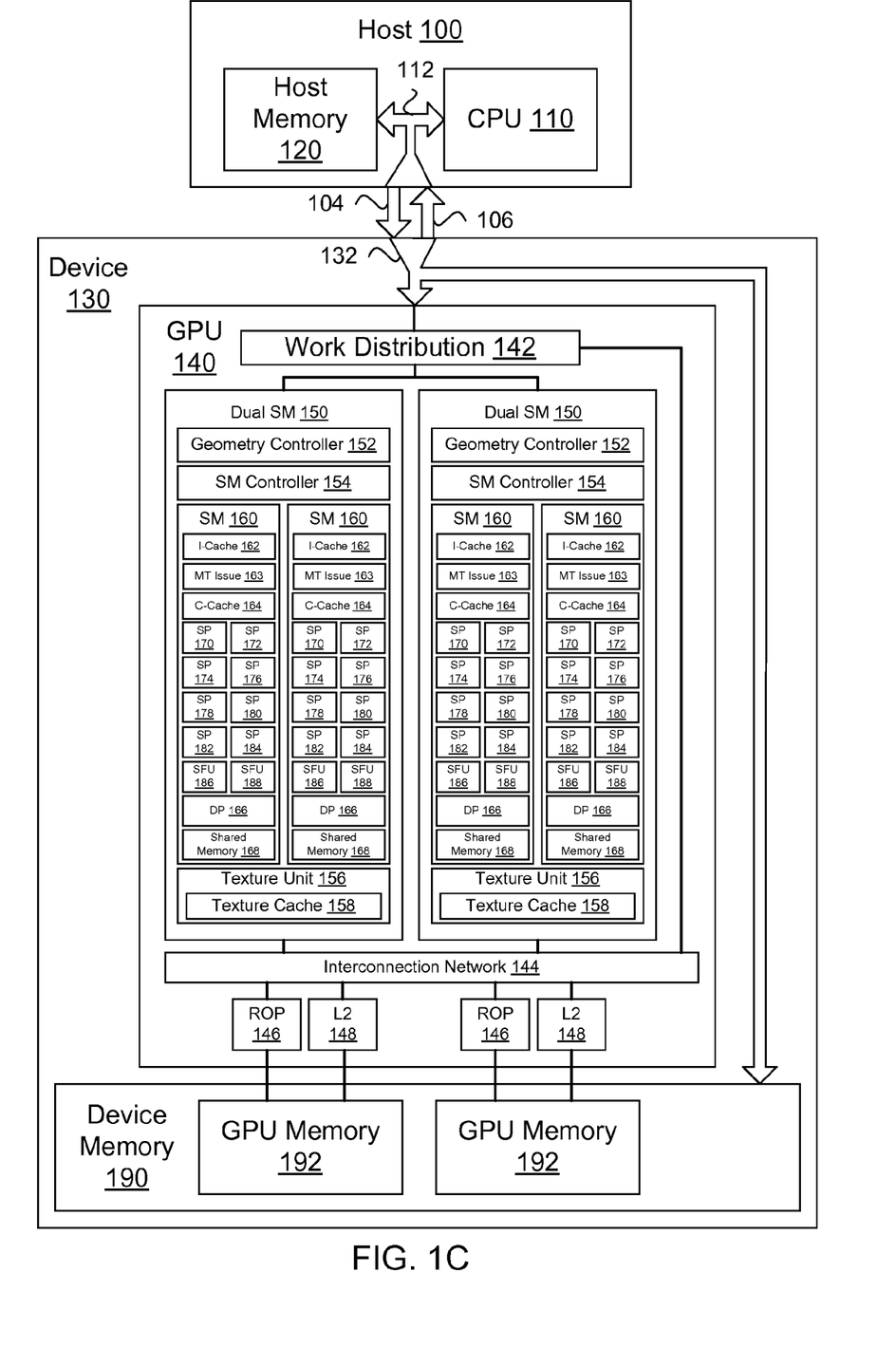
FIG. 1C is an illustration of a central processing unit (CPU), a graphics processing unit (GPU), and memory in accordance with an embodiment.

As illustrated in FIG. 1C, the host-device bus 102 (FIG. 1A) may have a channel or bus dedicated to a data flow for each direction. So, a host-to-device bus 104 transmits data from the host 100 to the device 130, and a device-to-host bus 106 transmits data from the device to the host. The device memory 190 may include a plurality of GPU memory chips, units, or modules 192. The GPU may include a plurality of sub-units or modules each with a plurality of multiprocessors also referred to as stream multiprocessors (SM) 160. Each SM may have a plurality of processing cores also referred to as stream processors (SP) 170-184. FIG. 1C illustrates a GPU with two dual SM 150, in which each dual SM has two individual SM units. Each SM illustrated in FIG. 1C has 8 SP. The GPU may have 32 individual processing cores. Each SM may include an instruction cache (I-Cache) 162, multi-threaded instruction unit (MT Issue) 163, constant cache (C-Cache) 164, a plurality of SPs, special function units (SFUs) 186, 188, a double precision unit (DP) 166, and shared memory 168. Function units on a SM may be local to the stream processors, such as shared memory and constant cache, and not accessible to other SPs not on the SM.

The SMs 150 may include a geometry controller 152, a SM controller (SMC), a plurality of SMs 160, and a texture unit (first texture layer) 156, which includes a texture cache 158. Each dual SM may be connected to the work distribution for the GPU, which distributes data and instructions to the SMs and ultimately the SPs. Each SM may be connected to an interconnection network 144 that may be coupled to device memory 190 through a raster operation pipeline (ROP) 146 and second texture layer (L2) 148. The texture cache may be accessible to all the SPs on the dual SM.

The GPU and the CPU can excel in processing different types of data, so the asymmetric architecture of the GPU and the CPU may be used. Partitioning the process so that both the CPU and the GPU are processing the process data according to each processes respective strengths and weaknesses can improve the runtime execution and efficiency of the process.

Processes function better on a GPU when the data is linear and can be subdivided to run in parallel on the GPU's processing cores. Linear data or linearly sub-dividable is data that can be accessed sequentially or predictably from memory without requiring the results of a prior computation on a processor in a data stream for the current computation or the memory access decision. Parallel data or parallelizable data is data that can use the same instructions repeated on different data. Because processing cores can operate efficiently on the same instruction but have each core handling different data and operate efficiently off a stream of data sent to the processing cores, data with linear and parallelizable characteristics can be processed faster on a GPU than a CPU. The global data utilized by the GPU processing core may be constant for GPU processing, so the order of the data processing on the processing cores may not affect the parallel computation results. Data that is has linear and parallelizable characteristics may be referred to as parallel processed data.

A CPU can operate more efficiently than a GPU on data where the results of a data computation on a processor determines the memory location of the next data point (or portion of data or next series of data points) used by the processor. The data may not be predicted or determined prior to the computation and may not be streamed because the data may be accessed in a random pattern or non-sequential locations in memory, called non-sequentially accessed data or non-streamed data. Data and data computations that rely on global data where the global data may change with another process, computation, or processor, called globally dependent data, may have more correct data results using a CPU over a GPU. Data that does not have linear or parallelizable characteristics may be referred to as sequentially processed data or serially processed data. Non-sequentially accessed data, non-streamed data, or globally dependent data may be referred to as sequentially processed data or serially processed data.

GPUs can have large setup times to process data and the GPU latencies used in streaming data between requesting or calling data and receiving data can be longer than CPU latencies, but for linear and parallelizable data the setup time costs can be smaller and be outweighed by the parallel processing efficiency of the GPU. The setup cost may include the cost of shipping the intermediate result, which can be a membership vector, between CPU and GPU. Some of the communication time may be hidden by using asynchronous memory transfers. Latency can be a time delay between the moment something is initiated (requesting data), and the moment one of its effects begins or becomes detectable (data present at the processor). Dividing data and tasks between parallel processed data and tasks that can run efficiently on a GPU and sequentially processed data and tasks that can run efficiently and consistently on a CPU can improve the efficiency of processes and applications using both a GPU and CPU.

Figure 2:
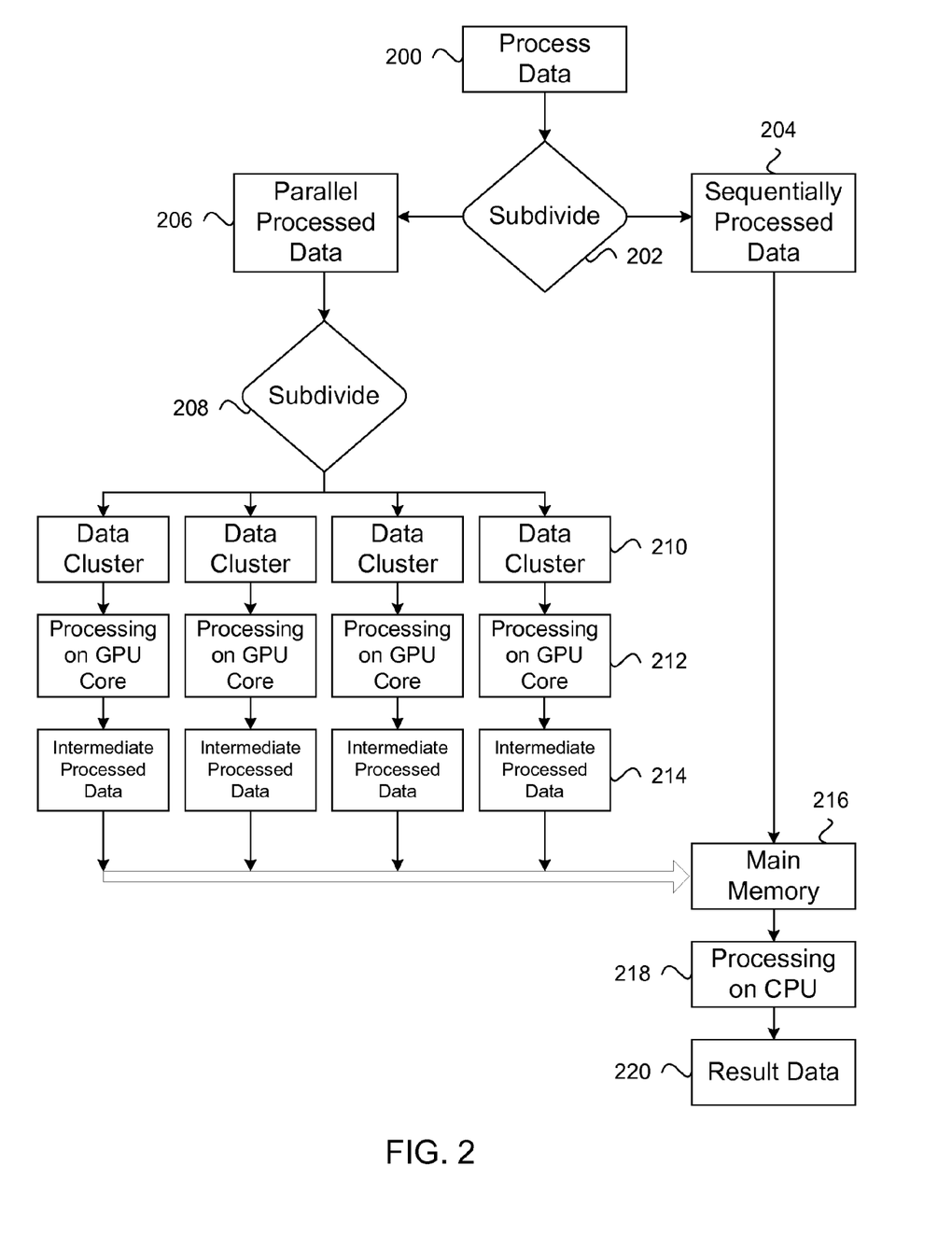
FIG. 2 is a flowchart illustrating the use of a graphics processing unit (GPU) and a central processing unit (CPU) in accordance with an embodiment.

Many processes and applications contain both parallel processed data and tasks and sequentially processed data and tasks. A method and system for optimizing computer processes to run jointly on a GPU and CPU may have a dataset or data that can be processed called process data 200, as shown in FIG. 2. A data sorter may be used to subdivide 202 process data into sequentially processed data and tasks 204 and parallel processed data and tasks 206.

The process or application used prior to subdividing or sorting the data may be referred to as an unsorted process. The data sorter may be an artificial intelligence (AI) process used to determine data, unsorted process, or unsorted application characteristics. Some BI analytics processes may use processes which know how to partition or divide the process data into parallel processed data and sequentially processed data. The data sorter may determine data characteristics by running the unsorted application or unsorted process on a CPU, GPU, or both and track the sequence of data, the relationship of data, data computations, or the jumps or breaks in the stream of data to determine parallel processed data from sequentially processed data. The efficiency of different computations, different computation times or sequences, and data types between the CPU and GPU processing may be compared to determine parallel processed data from sequentially processed data. Blocks of time spent on processing parallel processed data on a GPU may evaluated and compared with the setup time to prepare the GPU and data to determine the efficiency of running data on the GPU and whether data has parallel processed data characteristics. Heuristics and efficiencies may be used to determine parallel processed data from sequentially processed data. Data sorting may be performed by a user or human analysis of the specific unsorted process or types of unsorted processes.

Main memory 216 or CPU memory may be used to store the parallel processed data and the sequentially processed data. The parallel processed data may be segmented from the sequentially processed data in main memory. The parallel processed data may be sent to global memory or GPU memory. Constant sequentially processed data that may be constant during GPU processing may be duplicated on shared memory, constant cache, texture cache, or local GPU memory in the GPU.

The parallel processed data may be further subdivided 208 into a plurality of data blocks or data clusters 210 or sub-datasets that can be distributed or assigned to the plurality of processing cores of a GPU. The data blocks may be sent to the processing cores. Each operating processing core may receive a data block. The parallel processed data 206 may be subdivided into data blocks prior to being sent to the GPU or may be subdivided into data blocks by the GPU. The GPU may process the data block in parallel on the processing cores 212 with an intermediate processed data 214 resulting from each data block processed. The intermediate processed data may be sent from the GPU to global memory. The data blocks and intermediate processed data may be stored in global memory, shared memory, constant cache, texture cache, local GPU memory, or other GPU memory. Intermediate processed data may be stored in main memory 216. The CPU may receive intermediate processed data and sequentially processed data and process 218 intermediate processed data and sequentially processed data. The CPU may generate result data 220 from intermediate processed data and sequentially processed data.

In another configuration, the sequentially processed data may be computed on the CPU and generate an intermediate sequentially processed data stored in main memory prior to the parallel processing of parallel processed data on the GPU's processing cores. The intermediate sequentially processed data may be stored in global memory, shared memory, constant cache, texture cache, local GPU memory, or other GPU memory. GPU may process parallel processed data on processing cores after generating intermediate sequentially processed data on the CPU.

Sequentially processed data may be computed on the CPU concurrently with parallel processed data when sequentially processed data does not affect the GPU processing or share data with parallel processed data during GPU processing. CPU processing or GPU processing may set a flag and wait until the other process is finished, completed, or waiting on shared data that is being processed.

Sequentially processed data may be partitioned into constant sequentially processed data and variable sequentially processed data. Constant sequentially processed data may maintain a constant value during the processing of the data blocks on the GPU or during a portion of the processing of the data blocks. Variable sequentially processed data can varies in value during processing the data blocks on the GPU. Variable sequentially processed data may be referred to as shared update variables. A subgroup of processing cores may be configured to access a subgroup local GPU memory in the GPU for accessing sequentially processed data. For example, a subgroup of processing cores may be a stream multiprocessor (SM) 160 or SMs 150, as illustrated in FIG. 1C. For example, the subgroup local GPU memory may be constant cache 164, texture cache 158, or shared memory 168, but not global memory 190. Constant sequentially processed data may be stored in the subgroup local GPU memory for each subgroup of processing cores, which may be accessible to the processing cores of the subgroup. Using the subgroup local GPU memory may have faster access times than global memory. Variable sequentially processed data may be stored in GPU memory accessible to all processing cores. Variable sequentially processed data may only have one copy of the varied data that can be accessed by all the processing cores.

Using parallel processed data on the GPU may take advantage of a share-nothing strategy for implementing data parallelism by avoiding the use of shared update variables during GPU processing. The share-nothing strategy can be valuable in distributed processes and systems. When shared variables may be used to hold global sufficient statistics, the local sufficient statistics may be calculated in parallel on a GPU first without the use of the global shared variables. Global sufficient statistics may be data that is representative of global data or most of the dataset or calculated from global data or an aggregation of global data. Local sufficient statistics may be data that is representative of subset of global data called local data or calculated from local data. Then global sufficient statistics may be computed and updated by a CPU by aggregating statistics from the locally computed statistics. Even though GPUs have the global onboard memory shared among all multi-processors, the cost of synchronization for shared update variables may outweighs the benefits of using shared update variables. Limiting the use of shared update variables during GPU processing can enhance performance.

GPUs can use a memory hierarchy, which can be different from the CPU's cache/memory hierarchy. Parallel processed data referred to a data processed on the GPU or GPU data can be arranged to maximize the utilization of memory bandwidth. Data, including constant sequentially processed data, which remains constant during one kernel invocation may utilize the cache mechanism of constant or texture memory. Local GPU memory or shared memory may be used for data that may be accessed multiple times during one kernel invocation.

A kernel invocation may use a kernel. A kernel can be a basic component of an operating system managing the system's resources such as the communication between hardware and software components. A kernel can provide the lowest-level abstraction layer for the resources, including memory, processors and I/O devices, which application software or process may control to perform the application or process function. Kernel facilities may be available to application processes through inter-process communication mechanisms and system calls.

The GPU can offer better memory bandwidth compared to the CPU. The high bandwidth may be fully utilized by coalesced memory access. The GPU favors multiple threads working together or concurrently using similar instructions on continuous memory addresses, rather than having each thread work with the thread's own independent instructions and memory access. While the approach of independent memory access can often be used in CPU multi-thread optimization, GPUs can be optimized by concurrent memory access. A thread can be two or more concurrently running tasks contained inside a process.

The GPU data structure can be better utilized by structuring data to be column-based instead of row-based as commonly found in processes designed for CPU. The process data, data blocks, or intermediate sequentially processed data in a CPU memory may be transposed from a CPU row-based layout to a GPU column-based layout. The transposed data blocks can then be stored in GPU memory, shared memory, texture cache, constant cache, or local GPU memory. Transposing data may occur before processing the data blocks on the GPU. The process data, data block, or intermediate processed data in GPU memory, shared memory, texture cache, constant cache, or local GPU memory may be retransposed from the GPU column-based layout to the CPU row-based layout. The retransposed data may be sent to the CPU or CPU memory after processing the data blocks on the GPU.

The computer process with parallel processed data and the sequentially processed data may be a clustering process. The clustering process may include partial clustering, spectral clustering, divisive clustering, agglomerative clustering, K-Means, Apriori mining, quality threshold clustering, or locality-sensitive hashing. The computer process with parallel processed data and the sequentially processed data may be a BI process, such as EM, K-Harmonic Means, Support Vector Machines, and Combinatorial optimization.

For example, K-Means may use a method that partitions or subdivides a dataset and associated computing tasks into sequentially processed data and tasks, and parallel processed data and tasks, where the GPU processes the parallel processed data and the CPU processes the sequentially processed data and the intermediate processed data resulting from the parallel processed data can be processed on the GPU. The K-Means process is a clustering process or algorithm widely used in both academic research and industrial practices.

Given a number of clusters k, K-Means iteratively finds the k-centers of the data clusters. Each iteration can include two steps. One step can include partitioning the data set into k subsets by assigning each point to a subset whose center is the closest center to the point. Another step can include recalculating the k cluster centers as the geometric centers of the subsets. The K-Means process may repeat these two steps until no data point moves from one cluster to another or until no k cluster center changes value. The K-Means process may converge quickly and may stop in a finite number of iterations.

Figure 3A:
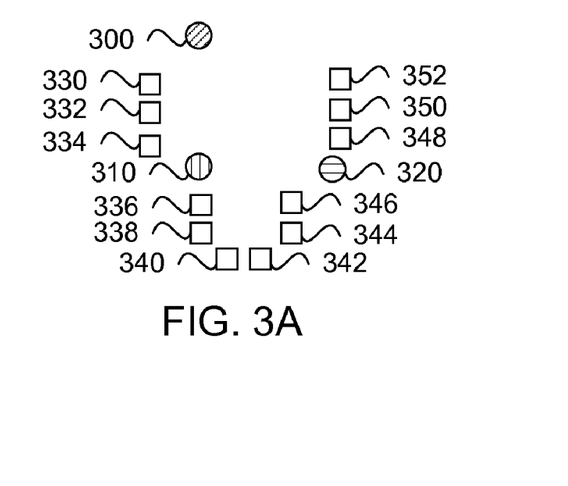
FIG. 3A is a block diagram illustrating determining centroids in a K-means process in accordance with an embodiment.

FIGS. 3A-3D illustrates the K-mean process. As illustrated in FIG. 3A, the k initial "means" may be randomly selected from the data set. The k number of centers 300, 310, and 320 selected may be three, which may also determine the number of clusters. The centers or center values may be referred to as centroids.

Figure 3B:
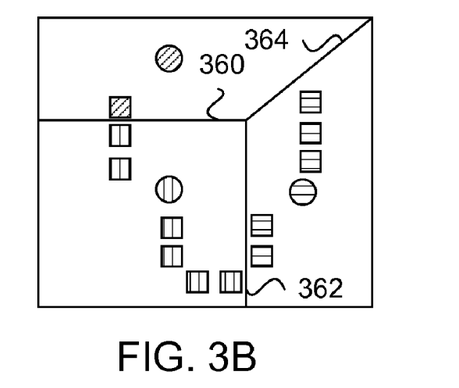
FIG. 3B is a block diagram illustrating assigning data points to a subset in a K-means process in accordance with an embodiment.

As illustrated in FIG. 3B, k clusters may be created by associating every observation or data point with the nearest mean. A first cluster may include a first data point 330 and may be associated with a first centroid 300. A second cluster may include a second set of data points 332, 334, 336, 338, 340, and 342 and may be associated with a second centroid 310. A third cluster may include a third set of data points 344, 346, 348, 350, and 352 and may be associated with a third centroid 320. The partitions between clusters may be represented the Voronoi diagram generated by the means illustrated in FIG. 3B. A first-to-second cluster partition 360 may illustrate a border, boundary, or partition between the first cluster and second cluster. A second-to-third cluster partition 362 may illustrate a border, boundary, or partition between the second cluster and third cluster. A first-to-third cluster partition 364 may illustrate a border, boundary, or partition between the first cluster and third cluster.

Figure 3C:
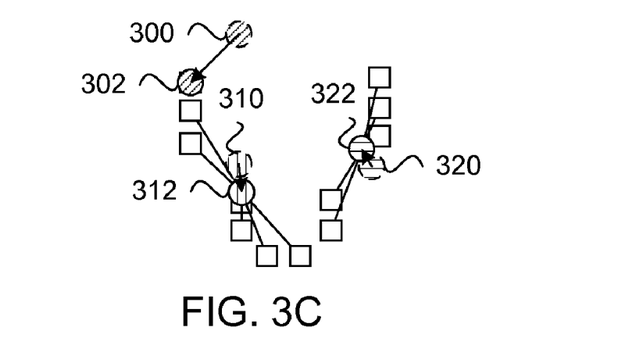
FIG. 3C is a block diagram illustrating recalculating centroids in a K-means process in accordance with an embodiment.

As illustrated in FIG. 3C, the centroids for each cluster may be calculated based on the center location for all the data points in the cluster. The centroid of each of the k clusters may become the new means. The first centroid 300 may be recalculated, redetermined, or repositioned to a first repositioned centroid 302 based on a center location for the first data point 330 in the first cluster. The second centroid 310 may be recalculated, redetermined, or repositioned to a second repositioned centroid 312 based on a center location for the second set of data points 332, 334, 336, 338, 340, and 342 in the second cluster. The third centroid 320 may be recalculated, redetermined, or repositioned to a third repositioned centroid 322 based on a center location for the third set of data points 344, 346, 348, 350, and 352 in the third cluster.

Figure 3D:
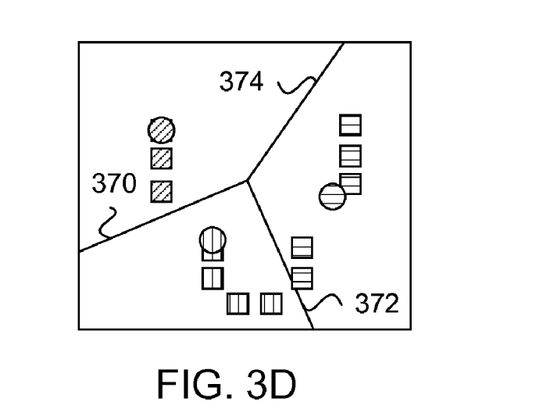
FIG. 3D is a block diagram illustrating reassigning data points to a subset in a K-means process in accordance with an embodiment.

As illustrated in FIG. 3D, each observation or data point may be reassigned to the repositioned nearest mean or centroid. A first modified cluster may include a first revised set of data points 330, 332, and 334 and may be associated with a first repositioned centroid 302. A second modified cluster may include a second revised set of data points 336, 338, 340, and 342 and may be associated with a second repositioned centroid 312. A third modified cluster may include a third revised set of data points 344, 346, 348, 350, and 352 and may be associated with a third repositioned centroid 322. The revised partitions between clusters may be represented the Voronoi diagram generated by the means illustrated in FIG. 3D. A first-to-second revised cluster partition 370 may illustrate a partition between the first modified cluster and second modified cluster. A second-to-third revised cluster partition 372 may illustrate a partition between the second modified cluster and third modified cluster. A first-to-third cluster partition 374 may illustrate a partition between the first modified cluster and third modified cluster. With the reassignment of data points, data points 332 and 334 moved from the second cluster to the first modified cluster. The steps illustrated in FIGS. 3C and 3D may be repeated until convergence has been reached and no data points out of a cluster.

A method may be used to partition K-Means the data points of the dataset into data clusters. Centroid data may be assigned as a data point in each of the data clusters. The centroid data may represent the data points in the data cluster or represent a center value for the data points in the data cluster. The centroid data can be sequentially processed data and processed on the CPU. The data points can be parallel processed data and processed on the GPU. The steps illustrated by FIG. 3A and the repositioning centroids of FIG. 3C may be processed by the CPU. The steps illustrated by FIG. 3B, the calculating of centroids of FIG. 3C, and FIG. 3D may be processed by the GPU.

Figure 4:
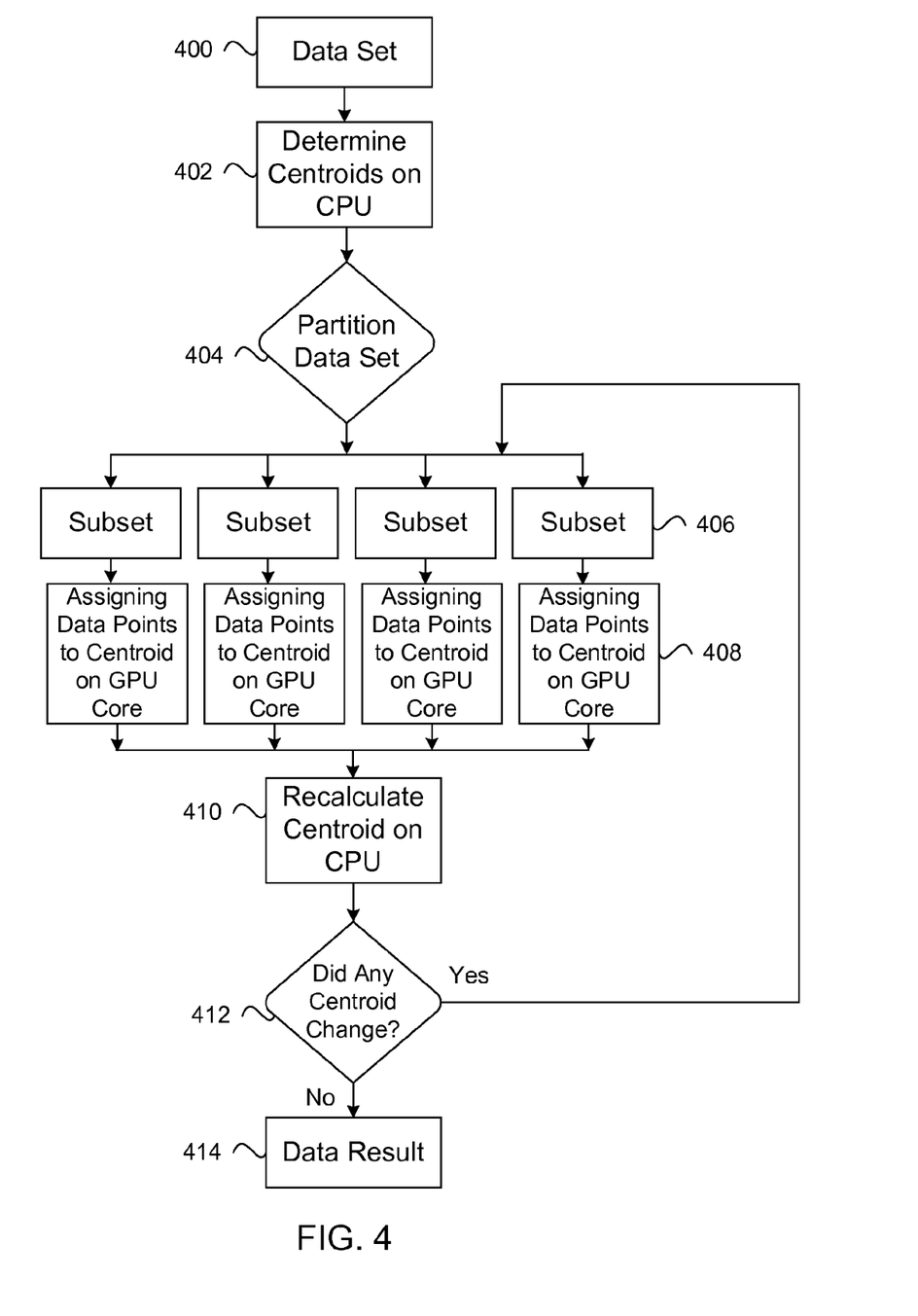
FIG. 4 is a flowchart illustrating the use of a graphics processing unit (GPU) and a central processing unit (CPU) in a K-means process in accordance with an embodiment.

The method for optimizing a K-Means process to run on a GPU and a CPU may include a data set 400, as illustrated in FIG. 4. A centroid may be determined on the CPU 402. The data set may be partitioned 404 into a predetermined number of subsets 406 using a CPU. The predetermined number of subsets may be the number of processing cores available on the GPU or the number determined by the application or business intelligence analytics data. Each subset may have a center value called the centroid. The center value may be initially assigned randomly, based on uniform spatial separation, estimated based on projections, or some other determination mechanism. A plurality of centroids may be created by partitioning the data set. Each data point of the data set may be assigned or distributed to a centroid 408 of one of the subsets. The assignment may be made to the centroid of a near subset closest in value. The near subset may be a subset closer to the data point then any other surrounding subsets determined by the subset's centroid value. The closest value may be determined by a distance measurement, a vector calculation, or another proximity calculation. Each data point assignment to a cluster may be made using one of a plurality of processing cores on the GPU and may be assigned to the near subset in parallel with other data points. Each centroid may be recalculated 410 as geometric center of the data points within each subset using the CPU. The method may check or verify if the centroid value changed 412.

If any of the centroid values changed, then each data point of the near subset may be reassigned to the centroid of a revised near subset 406 closest in value to each data point. The plurality of processing cores on the GPU may be used to reassign the data point to the centroid of a revised near subset and the data points may be reassigned to the revised near subset in parallel with other data points. Data points of a specified near subset may be the same as the data points in a specified revised near subset, as illustrated by the third cluster in FIG. 3B and the third modified cluster in FIG. 3D. Data points of a specified near subset may be different from the data points in a specified revised near subset, as illustrated by the second cluster in FIG. 3B and the second modified cluster in FIG. 3D. Data points may move into subsets different from the data point's prior subset as illustrated by data points 332 and 334 in FIGS. 3B and 3D. Data points may remain in the same subset as the data point's prior subset as illustrated by data points 330 and 336-352 in FIGS. 3B and 3D.

Returning to FIG. 4, if all of the centroid values remained constant, the process may return a data result 414. In another configuration, when no data point in the data set moves into a different subset from the data point's previous subset, the process may return a final data result. The method may recursively recalculate the centroid using the CPU and reassigning each data point of a subset using the GPU until no data point moves from one subset to another, which mean convergence occurs.

The data points and centroids for each subset may be stored in a CPU memory prior or after partitioning the data set. The data points and centroids in the CPU memory may be transferred to and stored in the GPU global memory. The centroids in the CPU memory may be transferred to and stored in a GPU's texture memory or cache, a GPU's shared memory, or a GPU's constant cache. The GPU may contain a plurality of stream multiprocessors (SM) and each SM may contain a plurality of processor cores. The plurality of centroids may be replicated on a local texture memory or cache, shared memory, or constant cache for each SM.

The data points in the CPU memory may be transferred to and stored in a GPU global memory. The data points may be transposed in GPU global memory from a CPU row-based layout to a GPU column-based layout. The data points may be transposed during the transfer of data from the CPU memory to the GPU global memory or while the data points are stored on the GPU global memory. The transposition may occur before assigning and reassigning each data point. The data points may be transposed each time data points are transferred to the GPU global memory. When the data set is larger than the GPU global memory, the data set may be transferred to and stored in blocks or subsections of the entire data set in the GPU global memory. Each block may be transposed. A CPU row or row data in the CPU row-based layout may represent each data point and a CPU column or column data may represent dimensions for the data points. A GPU row or row data in the GPU column-based layout may represent the dimensions for each data point and a GPU column or column data may represent all the data points associated with their dimensions. The centroids stored in the GPU's texture cache, the GPU's shared memory, or the GPU's constant cache may also be transposed and retransposed.

The data points may be transferred in the CPU memory to a GPU global memory and transferred in GPU global memory back to CPU memory. The data points may be retransposed in CPU memory or the GPU global memory from a GPU column-based layout to a CPU row-based layout. The retransposition may occur after assigning and reassigning each data point.

The centroid closest in value to each data point may be determined by the distance of the data point from the centroid. The distance may be determined by a distance measurement function which may include a Euclidean distance, a taxicab norm, a maximum norm, a Mahalanobis distance, an inner product space, and a Hamming distance. Each data point may use a plurality of data streams from GPU global memory to each processing core when assigning and reassigning data points.

A CPU's main memory, which can be ~100 times larger than a GPU's onboard memory or global memory which may be limited in size. With the size differential between the CPU's memory and the GPU's memory, the GPU's onboard memory may be too small to hold the entire data set stored in the CPU's memory. A problem may be the partitionability of the data, so each partition may be processed separately. As a result, the data may be partitioned into blocks that can fit within the GPU's memory. The process may use multiple iterations, and the entire data set may be copied from CPU's main memory to GPU's memory at every iteration. The motherboard-level interconnect or bus may be the only connection between CPU's main memory and GPU's memory, which may limit the bandwidth of the data transfer. In another embodiment, the K-Means data can be data-partitioned in a straightforward manner.

Figure 5:
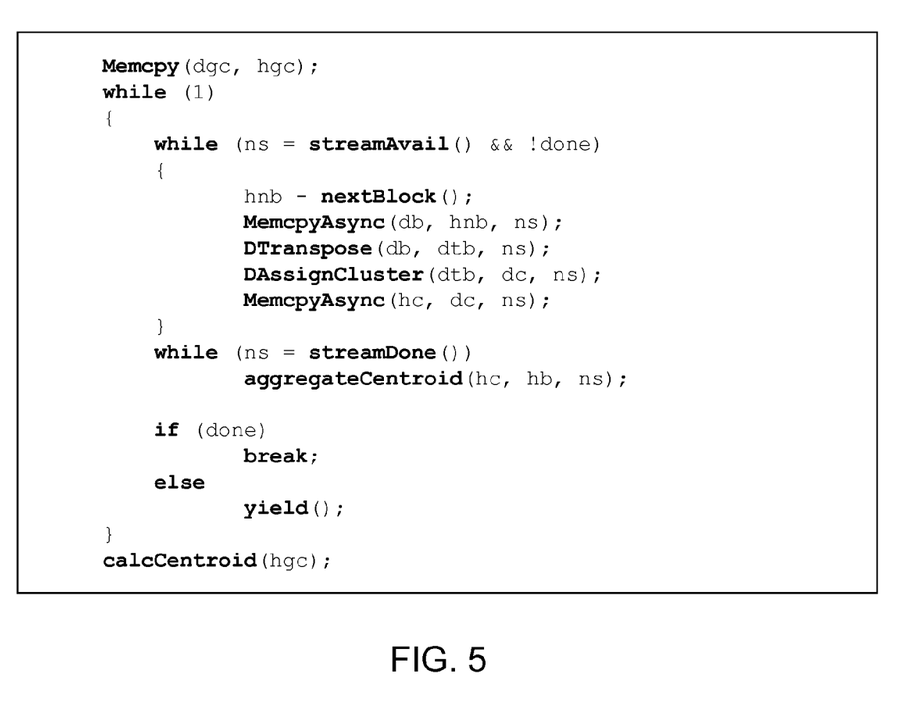
FIG. 5 is an illustration of stream based K-means process using CUDA in accordance with an embodiment.

Application programming interfaces (APIs) can be provided for asynchronous memory transfer and streaming. A process can proceed with computations on both the CPU and the GPU while memory transfer is in progress. FIG. 5 provides a simplified pseudocode process for asynchronous memory transfer and streaming using an API.

The dataset may be partitioned into large blocks. For each processing iteration, the blocks may be processed in turn, with overlap, until all of the blocks have been processed. Each block may be transferred from CPU to GPU and transposed to a column-based layout. With the transposed layout, the cluster membership may be computed for each data point on the GPU and then may be transferred back to the CPU, where the CPU does a partial aggregation on centroids. In addition, API streams may be used to keep track of the progress on each stream. Calls may be asynchronous, which can give maximum possibilities to overlapping or concurrent computation and memory transfers.

The data transposition from row-based to column-based may be handled by using a separate GPU kernel or transpose process to transpose the data block once the data block is transferred to the GPU or to retranspose the data block once the data block is transferred to the CPU. When the size is small enough so the entire data fits into the GPU memory, the dataset may be transposed once and may be used for all iterations. When the entire dataset does not fit into the GPU memory, either the transposition can be performed per iteration, which can have a high overhead cost, or the CPU memory may keep two copies of the dataset, one row-based and the other column-based, which may not be practical. Avoiding transposition altogether and forcing the GPU to work on row-based data may be unacceptable in GPU performance because row-based data may not process inefficiently on GPU architecture designed for column-base data. The frequent problem of the transposition of data from row-based to column-based and back to row-based can be efficiently handled by a separate GPU kernel or transpose process to transpose the data block once the data block is transferred.

At each iteration of the optimization of the K-Means process, the centroid calculations may be postponed until the membership assignments can be made. The centroid values may be kept in constant memory which can be cached. The constant memory or cache may have a smaller memory size but a faster access than other GPU memory, such as texture memory and global memory. When the data set of centroids is larger than the size of constant cache, texture cache may be used to store centroids. Texture cache may have a smaller memory size but a faster access than the GPU's global memory. Using constant cache may be faster than using texture cache, and using texture cache may be faster than using global memory. Constant cache may be smaller than texture cache, and texture cache may be smaller than global memory.

GPUs can be used as accelerators for BI analytics even with very large data sets that cannot fit into GPU's onboard memory. Large data sets may be common in real world BI scenarios. The K-Means clustering algorithm can utilize the GPU's parallel processing for a large segment of processing of determining data points. For smaller clustering data sets, the entire data set may fit within the GPU's onboard memory, and center values for subsets or clusters of the data set may fit within a GPU's constant memory. The centroids in a K-Means process may be computed iteratively.

A result of the technology may be faster computations for processes configured to use GPU-accelerated implementations. The performance of the GPU-accelerated process can outperform CPU only version by a wide margin. The process may have improved cost-performance ratios and energy-performance ratios for BI analytics.

Figure 6:
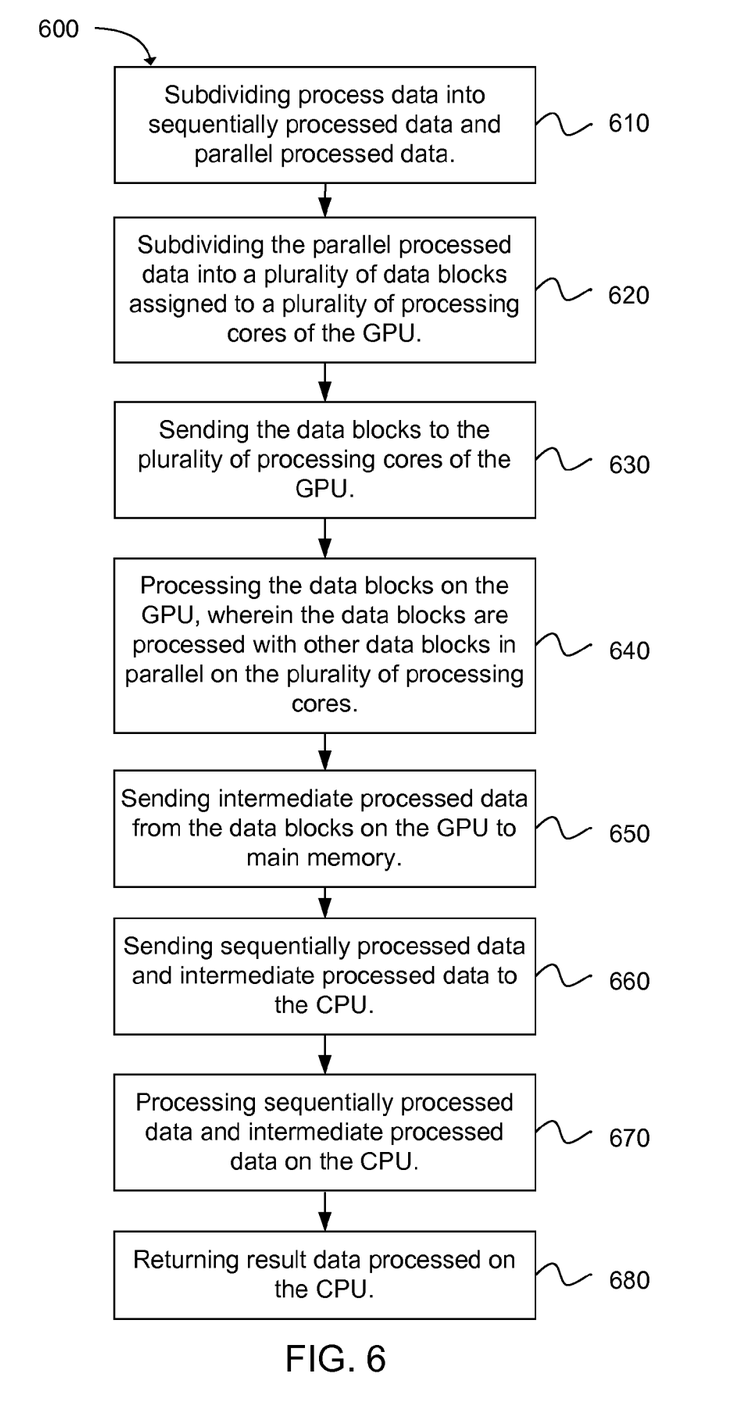
FIG. 6 is a flowchart illustrating an optimization of a query expression on a database engine of a database server in accordance with an embodiment.

Another embodiment provides a method 600 for optimizing computer processes executing on a graphics processing unit (GPU) and a central processing unit (CPU), as shown in the flow chart in FIG. 6. The method includes the operation of subdividing 610 process data into sequentially processed data and parallel processed data. The operation of subdividing 620 the parallel processed data into a plurality of data blocks assigned to a plurality of processing cores of the GPU follows. The next operation of the method may be sending 630 the data blocks to the plurality of processing cores of the GPU. The method includes processing 640 the data blocks on the GPU. The data blocks may be processed with other data blocks in parallel on the plurality of processing cores. The operation of sending 650 intermediate processed data from the data blocks on the GPU to main memory follows.

The method 600 further includes sending 660 sequentially processed data and intermediate processed data to the CPU. Next, the operation of processing 670 sequentially processed data and intermediate processed data on the CPU can be performed. The operation of returning 680 result data processed on the CPU follows.

The method and system for optimizing computer processes executing on a graphics processing unit (GPU) and a central processing unit (CPU) may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data. Additionally, the method and system for optimizing a query expression on a database engine of a database server may be downloaded as a computer program product transferred from a server or remote computer to a requesting or client device by way of machine readable data signals embodied in a carrier wave or other propagation medium.

A method for optimizing computer processes executing on a graphics processing unit (GPU) and a central processing unit (CPU) may use existing graphics APIs that provide general purpose interfaces for handling general purpose applications. For example, NVidia's CUDA programming language may provide software support extended from the C language to run on a CUDA enabled hardware computing engine. The CUDA enabled hardware computing engine can have a highly parallel architecture with hundreds of cores and very high memory bandwidth. With CUDA-enabled devices and the C-like programming environment, GPUs can be used to accelerate applications with respectable speed performance gains compared to CPU-only implementations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for optimizing a computer process executing on a graphics processing unit (GPU) and a central processing unit (CPU), comprising:
   running an unsorted process on a processor to determine process data characteristics;
   subdividing process data into sequentially processed data and parallel processed data based on a determination of said process data characteristics;
   subdividing the parallel processed data into a plurality of data blocks assigned to a plurality of processing cores of the GPU;
   processing the data blocks on the GPU and not on the CPU, wherein the data blocks are processed with other data blocks in parallel on the plurality of processing cores;
   processing sequentially processed data on the CPU and not on said GPU; and
   returning result data processed on the CPU.

2. The method of claim 1, further comprising sending intermediate processed data from the data blocks on the GPU to main memory after processing the data blocks on the GPU and processing intermediate processed data with sequentially processed data on the CPU.

3. The method of claim 1, wherein the parallel processed data is linearly sub-dividable and parallelizable data.

4. The method of claim 1, wherein the sequentially processed data is selected from the group consisting of non-streamed data, serially processed data, and data with global dependencies.

5. The method of claim 1, further comprising partitioning sequentially processed data into constant sequentially processed data and variable sequentially processed data, wherein a subgroup of processing cores is configured to access a local GPU memory in the GPU,
   wherein constant sequentially processed data is stored in the local GPU memory for each subgroup of processing cores, and constant sequentially processed data maintains a constant value during processing the data blocks on the GPU, and wherein variable sequentially processed data is stored in GPU memory generally accessible to processing cores, and wherein variable sequentially processed data varies in value during processing the data blocks on the GPU.

6. The method of claim 1, further comprising transposing the data blocks from a row-based layout to a column-based layout and storing transposed data blocks in GPU memory before processing the data blocks on the GPU, and further comprising retransposing intermediate processed data from the column-based layout to the row-based layout and sending the retransposed intermediate processed data to main memory after processing the data blocks on the GPU and generating intermediate processed data.

7. The method of claim 6, wherein transposing the data blocks from the row-based layout to the column-based layout transposes a portion of the data blocks concurrently with processing the data blocks on the GPU and wherein a portion of retransposing the intermediate processed data from the column-based layout to the row-based layout transposes a portion of the data blocks concurrently with processing sequentially processed data and intermediate processed data on the CPU.

8. The method of claim 1, wherein the computer process is a clustering process selected from the group consisting of partial clustering, spectral clustering, divisive clustering, agglomerative clustering, K-means, Apriori mining, quality threshold clustering, and locality-sensitive hashing.

9. A method for optimizing a K-means process to execute on a graphics processing unit (GPU) and a central processing unit (CPU), comprising:
providing at least one application programming interface (API) to asynchronously transfer memory and stream data between said GPU and said CPU;
partitioning a data set into a predetermined number of subsets using a central processing unit (CPU), wherein each subset has a center value called a centroid, and a plurality of centroids are created by partitioning the data set;
assigning each data point of the data set to one of the subsets with the centroid of a near subset closest in value to each data point using a plurality of processing cores on the GPU, wherein data points are assigned to the near subset in parallel with other data points;
recalculating each centroid as geometric center of the data points within each subset using the CPU; and
reassigning each data point of the near subset to the centroid of a revised near subset closest in value to each data point using the plurality of processing cores on the GPU, wherein data points are reassigned to the revised near subset in parallel with other data points, wherein the data set is partitioned into sequentially processed data to be processed by the CPU and parallel processed data to be processed by the GPU.

10. The method of claim 9, further comprising recursively recalculating the centroid using the CPU and reassigning each data point of a subset using the GPU until no data point moves from one subset to another.

11. The method of claim 9, further comprising storing data points and centroids for each subset in a CPU memory after partitioning the data set.

12. The method of claim 11, further comprising transferring data points and centroids in the CPU memory to a GPU main memory.

13. The method of claim 11, further comprising transferring centroids in the CPU memory to a local GPU memory, wherein the GPU contains a plurality of stream multiprocessors (SM) and each SM contains a plurality of processor cores, and the plurality of centroids are replicated on the local GPU memory for each SM.

14. The method of claim 11, further comprising transferring data points in the CPU memory to a GPU global memory, and further comprising transposing the data points in the GPU global memory from a CPU row-based layout to a GPU column-based layout before assigning and reassigning each data point.

15. The method of claim 14, wherein a CPU row in the CPU row-based layout is the data point and a CPU column is a dimension, and a GPU row in the GPU column-based layout is the dimension and a GPU column is the data point.

16. The method of claim 11, further comprising transferring data points in the CPU memory to a GPU global memory and transferring data points in GPU global memory to CPU memory, and further comprising retransposing the data points in CPU memory from a GPU column-based layout to a CPU row-based layout after assigning and reassigning each data point.

17. The method of claim 9, wherein the centroid closest in value to each data point is determined by a distance of the data point from the centroid.

18. The method of claim 17, wherein the distance is determined by a distance measurement function selected from the group consisting of Euclidean distance, taxicab norm, maximum norm, Mahalanobis distance, inner product space, and Hamming distance.

19. A system for optimizing computer processes to execute on a graphics processing unit (GPU) and a central processing unit (CPU), comprising:
a data sorter configured to subdivide process data and tasks, based on a determination of data characteristics, into sequentially processed data and tasks and parallel processed data and tasks, and subdividing the parallel processed data and tasks into a plurality of data blocks, wherein said data sorter runs an unsorted process on a processor to determine said data characteristics;
a main memory configured to store sequentially processed data and tasks and parallel processed data and tasks;
a global memory configured to store parallel processed data and tasks;
a GPU configured to process the plurality of data blocks in parallel and not for processing the sequentially processed data, wherein each data block is assigned to a processing core of a plurality of processing cores of the GPU, and wherein the GPU sends intermediate processed data from the data blocks to main memory; and
a CPU configured to process intermediate processed data and sequentially processed data and not process the parallel processed data, and to return result data processed on the CPU.

20. The system of claim 19, wherein sequentially processed data is partitioned into constant sequentially processed data and variable sequentially processed data, wherein
constant sequentially processed data is stored in a local GPU memory in the GPU for each subgroup of processing cores, and constant sequentially processed data maintains a constant value during processing the data blocks on the GPU, and
variable sequentially processed data is stored in global memory accessible to processing cores, and variable sequentially processed data is configured to vary in value during processing the data blocks on the GPU.

* * * * *